(12) United States Patent
Nyström et al.

(10) Patent No.: US 10,755,388 B2
(45) Date of Patent: Aug. 25, 2020

(54) METHOD, DEVICE AND SYSTEM FOR A DEGREE OF BLURRING TO BE APPLIED TO IMAGE DATA IN A PRIVACY AREA OF AN IMAGE

(71) Applicant: Axis AB, Lund (SE)

(72) Inventors: Johan Nyström, Lund (SE); Song Yuan, Lund (SE); Björn Ardö, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/393,916

(22) Filed: Apr. 24, 2019

(65) Prior Publication Data
US 2019/0340731 A1 Nov. 7, 2019

(30) Foreign Application Priority Data
May 3, 2018 (EP) .................................. 18170603

(51) Int. Cl.
*G06T 5/00* (2006.01)
*G06T 5/20* (2006.01)
*H04N 1/44* (2006.01)

(52) U.S. Cl.
CPC ............ *G06T 5/002* (2013.01); *G06T 5/20* (2013.01); *H04N 1/448* (2013.01); *H04N 2201/0084* (2013.01)

(58) Field of Classification Search
CPC . G06T 5/002; G06T 5/20; G06T 2207/30196; H04N 1/448; H04N 2201/0084; H04N 7/18; H04N 5/232; H04N 21/25866; H04N 21/262; H04N 21/4223; H04N 21/4307; H04N 21/44218; H04N 21/45455; H04N 21/23219; H04N 21/23229; H04N 21/23238; G08B 13/19686; G06K 9/00778; G06K 9/00362; G06K 9/00369; G06K 9/00771; G06K 9/00201; G06K 9/00281; G06K 9/00335; G06K 9/00342; G06K 9/00744; G06K 9/4604
See application file for complete search history.

(56) References Cited

U.S. PATENT DOCUMENTS 7,493,038 B2 * 2/2009 Kang ..................... H04N 5/232
348/333.12
8,195,598 B2 * 6/2012 Hua ........................ G06N 5/02
706/62

(Continued)

FOREIGN PATENT DOCUMENTS

DE 102014223433 A1 9/2015
JP 2011-130271 A 6/2011
WO 2010/036098 A1 4/2010

OTHER PUBLICATIONS

Korean Office Action dated May 15, 2020 for the Korean Patent Application No. 10-2019-0039542.

*Primary Examiner* — Michael S Osinski
(74) *Attorney, Agent, or Firm* — Volpe and Koenig, P.C.

(57) ABSTRACT

Methods and devices for protecting personal privacy in captured image data by controlling privacy masking of an image, where the degree of blurring to be applied to a privacy area of the image depends on a threshold distance from the image capturing device, and the spatial resolution of content of the scene at this distance in the image.

13 Claims, 6 Drawing Sheets

(56) References Cited

U.S. PATENT DOCUMENTS

| | | | | |
|---|---|---|---|---|
| 8,305,448 B2* | 11/2012 | Yoda | G06T 11/60 | 348/152 |
| 8,571,274 B2* | 10/2013 | Hosoi | G06T 7/73 | 382/118 |
| 8,576,282 B2* | 11/2013 | Salgar | G08B 13/19686 | 348/143 |
| 8,666,110 B2* | 3/2014 | Yoo | H04N 7/18 | 382/100 |
| 8,970,697 B2* | 3/2015 | Inami | G06T 1/00 | 348/143 |
| 9,532,008 B2* | 12/2016 | Ohnishi | G03B 21/26 | |
| 9,854,210 B2* | 12/2017 | Herrli Anderegg | G08B 13/19645 | |
| 10,062,406 B2* | 8/2018 | Park | G11B 20/00086 | |
| 10,083,319 B2* | 9/2018 | Wilmes | H04W 4/023 | |
| 10,169,597 B2* | 1/2019 | Ghafourifar | G06F 21/6209 | |
| 10,176,381 B2* | 1/2019 | Zhao | G06K 9/00778 | |
| 10,440,229 B2* | 10/2019 | Drako | G06T 7/292 | |
| 10,594,988 B2* | 3/2020 | Iwasaki | G08B 13/19686 | |
| 10,607,462 B2* | 3/2020 | Drako | G08B 13/19686 | |
| 2004/0081338 A1* | 4/2004 | Takenaka | G08B 13/1961 | 382/118 |
| 2005/0068437 A1* | 3/2005 | Hayasaka | G08B 13/19686 | 348/294 |
| 2005/0129272 A1* | 6/2005 | Rottman | G06K 9/00228 | 382/103 |
| 2005/0275723 A1* | 12/2005 | Sablak | G06T 7/215 | 348/169 |
| 2006/0187237 A1* | 8/2006 | Park | H04N 7/18 | 345/625 |
| 2006/0192853 A1* | 8/2006 | Lee | G08B 13/19686 | 348/143 |
| 2006/0206911 A1* | 9/2006 | Kim | H04N 5/232 | 725/12 |
| 2009/0015670 A1* | 1/2009 | Gopinath | H04N 7/18 | 348/143 |
| 2009/0034793 A1* | 2/2009 | Dong | G06K 9/00778 | 382/103 |
| 2009/0244364 A1* | 10/2009 | Nonogaki | H04N 7/17318 | 348/438.1 |
| 2010/0162285 A1* | 6/2010 | Cohen | H04N 21/42201 | 725/12 |
| 2011/0123068 A1 | 5/2011 | Miksa et al. | | |
| 2012/0062749 A1* | 3/2012 | Kawahata | G06K 9/00362 | 348/152 |
| 2012/0098854 A1* | 4/2012 | Ohnishi | G03B 21/26 | 345/626 |
| 2013/0070092 A1* | 3/2013 | Miyahara | H04N 5/232 | 348/143 |
| 2014/0002686 A1* | 1/2014 | Nagaike | H04N 5/235 | 348/222.1 |
| 2014/0037262 A1* | 2/2014 | Sako | H04N 9/8205 | 386/223 |
| 2014/0085463 A1* | 3/2014 | Kwon | G06T 11/00 | 348/143 |
| 2014/0176663 A1 | 6/2014 | Cutler et al. | | |
| 2015/0085163 A1 | 3/2015 | Aimi et al. | | |
| 2016/0150188 A1* | 5/2016 | Ha | H04N 7/183 | 348/143 |
| 2016/0163171 A1* | 6/2016 | Yamazaki | G01V 8/20 | 348/152 |
| 2019/0188488 A1* | 6/2019 | Ito | G08B 25/00 | |
| 2019/0318106 A1* | 10/2019 | Yu | H04N 21/4405 | |
| 2020/0098096 A1* | 3/2020 | Moloney | G06K 9/00228 | |

* cited by examiner

METHOD, DEVICE AND SYSTEM FOR A DEGREE OF BLURRING TO BE APPLIED TO IMAGE DATA IN A PRIVACY AREA OF AN IMAGE

TECHNICAL FIELD

The present invention relates to the field of protecting personal privacy in captured image data. In particular it relates to methods and devices for controlling privacy masking of image and/or video content.

BACKGROUND

The right to feel safe and secure is one of the most important basic principles in society, and this is where surveillance systems have an important function, as long as they are used in accordance with prevailing legislation. There is an ongoing debate about the implications of surveillance on privacy. Recent developments in network camera technology have led to several different applications that can be implemented to limit surveillance and thus protect privacy. One such development is privacy masking, which enables selected areas of a scene to be blocked or masked from viewing and recording. It allows masking to be maintained even as a field of view of the image capturing device (e.g. a video camera) changes through panning, tilting and zooming as the masking moves with the coordinate system of the device. Privacy masking may be achieved by blurring pixels within a privacy area of the captured images, so specific details (such as a face of a person) in this area cannot be deciphered or interpreted by a user looking at the video stream.

When applying privacy masking, care should be taken to not to blur image data in the privacy area more than necessary, to still be able use the captured video for surveillance purposes in the best possible way. This may be achieved by limiting the degree of blurring applied to the privacy area of the image based on blur in the image already being present due to the current settings and hardware of the image capturing device (e.g. parts of the image being unfocused or having low spatial resolution).

US2015085163 (Canon) discloses one solution to how to limit the degree of blurring. This document discloses a method where imaging data is analysed to determine if there is a privacy protection target present, i.e. a detected face. A focus range corresponding to the currently used F-number is determined. If the protection target is located within the focus range, a relatively large blur amount is added. If the protection target is located outside the focus range, a lower (or no) blur amount is added since the target will be blurred to some degree already. US2015085163 teaches that a predetermined look-up-table is used to determine the amount of added blur needed for different F-number settings and distances from the best focus position. The method in US2015085163 is complex, since a protection target needs to be determined, and the distance to this target needs to be calculated, before the blurring of the area of the image where the protection target is present can be determined. Moreover, the predetermined look-up-table reduces the flexibility of the method and requires specific look-up table for every camera system. Furthermore, different use cases require different amount of blurring being present in a privacy area. For example, a use case involving blurring of number plates of a car may require a different amount of blurring to be impossible to decipher compared to a use case involving blurring of a face of a person.

There is thus a need for improvements within this context.

SUMMARY OF THE INVENTION

In view of the above, an improved method for determining a degree of blurring to be applied to image data in a privacy area of an image would be beneficial.

According to a first aspect, there is provided a method of for determining a degree of blurring to be applied to image data in a privacy area of an image, the image depicting a scene and being captured by an image capturing device, the method comprising the steps of:

receiving input relating to coordinates of the privacy area of the image;

receiving input relating to a threshold spatial resolution of image data corresponding to content of the scene located beyond a threshold distance from the image capturing device in the scene, said image data being within the privacy area of the image;

calculating a maximum spatial resolution of the image data of the image corresponding to content of the scene located on or beyond the threshold distance from the image capturing device;

calculating a difference between the maximum spatial resolution and the threshold spatial resolution;

determining a degree of blurring based on the calculated difference, such that for a first difference being larger than a second difference, the degree of blurring determined based on the first difference is larger than the degree of blurring determined for the second difference;

applying the degree of blurring to the image data in the privacy area of the image.

As used herein, by "input relating to coordinates of the privacy area of the image" is generally meant any input which can be used for determining a privacy area of the image. For example, the input may be based on real worlds coordinates of the captured scene, either global coordinates such as GPS coordinates, or coordinates being relative to the position of the image capturing device such as a range of angles (e.g. 35-45°). This input may then be translated to coordinates in the image which corresponds to the privacy area. According to other embodiments, the input may describe an area (coordinates) of the captured image, e.g. a pixel range such as Y: 40-80, X: 100-500.

As used herein, by "degree of blurring" is generally meant to what extent the image data is blurred. The blurring may be performed using any suitable type of low-pass filter, also called a "blurring" or "smoothing" filter, which averages out rapid changes (i.e. details) in intensity in the image data. The determined degree of blurring will thus reduce the spatial resolution of the image data which was low-pass filtered. The degree of blurring may for example determine the kernel size in an average filter, or the radius of a Gaussian in a gaussian filter.

As used herein, by "threshold distance" is generally meant a distance value relative to the location of the image capturing device, e.g. 7 meters, 30 meters, 0.9 meters etc. (based on the use case).

The threshold spatial resolution corresponds to an allowed sharpness of details for objects in the image located at the threshold distance or beyond in the scene. The threshold spatial resolution may also be called circle of confusion criterion, threshold angular resolution, threshold for number of independent pixel values per unit length etc. The spatial resolution describes the ability of any image-forming device, such as a camera to distinguish small details of an object. By setting a threshold spatial resolution, the allowed spatial resolution at the threshold distance or beyond may be based on the use case. For example, for ensuring the privacy of persons located in the privacy area (i.e. at or beyond the threshold distance, in a specific privacy area in the scene), the allowed (threshold) spatial resolution may be 1 pixel per decimeter of the scene at the threshold distance. At this spatial resolution, it may not possible to recognize the face of the person, thus the privacy of the person may be ensured. Other threshold spatial resolution may of course be applied, such as 2, 3, 10, etc. pixels per decimeter.

The step of calculating a maximum spatial resolution may be done using any algorithm known to the skilled person, i.e. to determine the current maximum spatial resolution for content on or beyond the threshold distance in the scene, given by the current focus curve of the image capturing device.

Using the methods presented herein, it may be achievable to set up a privacy area, where the blurring applied to the privacy area depends also on a threshold distance from the image capturing device, and what spatial resolution content of the scene at this distance have in the image. By doing this, objects in the foreground, which are within the privacy area, but located closer to the image capturing device than the threshold distance (and thus not required to be blurred to an impossibility of recognition for privacy reasons) may in some cases not be blurred, or blurred to an lower degree, since, in these cases, the image data corresponding to content of the scene located beyond the threshold distance from the image capturing device in the scene will anyway be blurred to some degree due to e.g. the current focus curve, or depth of field, of the image capturing device. In some cases, the inherent blurring of the content beyond the threshold distance may be enough to meet the threshold spatial resolution requirement (e.g. due to a high zoom level, and/or focus on an object in the foreground), and no additional degree of blurring may be needed to be applied (zero degree of blurring). In other cases, only a low degree of blurring may be needed to be applied to meet the spatial resolution requirement of image content beyond the threshold distance, resulting in that the object in the foreground may still be recognizable.

By calculating a difference between the maximum spatial resolution of the image data of the image corresponding to content of the scene located on or beyond the threshold distance from the image capturing device and the threshold spatial resolution, and determine the degree of extra blurring to be applied to the image content in the privacy area of the image based on this distance, the above advantages may be achieved. By applying the degree of blurring (being above zero), the spatial resolution of the image data corresponding to content of the scene located beyond a threshold distance from the image capturing device in the scene (and within the privacy area of the image), will be reduced to be on or below the threshold spatial resolution.

Moreover, by requiring input relating to the threshold spatial resolution, this requirement may be based on the current use case.

According to some embodiments, if the calculated difference is zero or negative, the degree of blurring is determined to be zero. In this case, the sharpness (focus) of the image data of the image corresponding to content of the scene located on or beyond the threshold distance from the image capturing device is low enough to meet the threshold spatial resolution and thus to ensure the privacy of objects in the privacy area (based on the use case). Consequently, no additional degree of blurring need to be applied to the image content. This reduces the required processing power for performing the method, as well as increases the possibility to recognize objects located closer to the image capturing device than the threshold distance, thus improving the usefulness of the captured image.

According to some embodiments, the method further comprises the steps of:

when the difference is above a threshold difference, determining the degree of blurring to a predetermined value, and when the difference is between zero and the threshold difference, determining the degree of blurring to a value between zero and the predetermined value, wherein the value is related to the difference.

In this embodiment, a max blurring factor (predetermined value) may be implemented, e.g. a 128*128 pixels blurring. Between zero difference and the threshold difference, the degree of blurring is determined based on the difference, for example a step function being step wise correlated to the distance, or a continuous function correlated to the difference. The present embodiment may provide a flexible method of determining the degree of blurring to be applied to the image data.

According to some embodiments, the step of calculating the maximum spatial resolution is performed based on a focal length of an optical system of the image capturing device, the F-number of the optical system of the image capturing device and a pixel pitch of an image sensor of the image capturing device.

As used herein, by "optical system of the image capturing device" is generally meant the optical lens or assembly of lenses included in the image capturing device.

As used herein, by "pixel pitch" is generally meant the approximate width of one pixel on the image sensor of the image capturing device, e.g. calculated by taking the width of active area of sensor divided by the number of pixels of the sensor in a horizontal direction. The pixel pitch may thus be defined as the center-to-center distance between individual pixels, often defined in microns. Using these properties of the camera, a focus curve may be calculated, defining the spatial resolution of all content of the scene in the image, based on the distance from the image capturing device. This curve can then be used for calculating the maximum spatial resolution of the image data of the image corresponding to content of the scene located on or beyond the threshold distance from the image capturing device, to further determine the degree of blurring that needs to be applied to the privacy area of the image in order to meet the threshold spatial resolution.

According to some embodiments, the step of applying the degree of blurring to the image comprises one from the list of: applying a gaussian filter, applying an average filter (mean filter), applying a pixelization filter, wherein the degree of blurring determines the size of the applied filter.

The degree of blurring defines may thus define the kernel size or similar for these filters. Other types of filters may be applied. A combination of filters may also be applied.

According to some embodiments, the method comprises determining that the privacy area covers at least a threshold portion of the image, setting a focus limit of the image capturing device to the threshold distance or less. In this embodiment, the knowledge of the threshold distance, i.e. that objects on or beyond this distance from the image capturing device should not be represented by image data with too high spatial resolution for privacy reasons, can be used to set a focus limit of the image capturing device, especially when the privacy area covers a larger portion of the image such as 40%, 50%, 75% 90% etc. Objects at this distance have no reason to be in focus since the corresponding image data will be blurred anyway. Advantageously, this may reduce the required processing power for ensuring privacy, as well as simplify the setting of focus for the image capturing device. According to some embodiments, the privacy area must cover the center pixel of the image, for this embodiment to be applied, since in this case it can be assumed that it is the privacy area of the scene which is of most interest for a viewer of the captured image, and that the limited focus abilities of the camera thus not will affect the usefulness (from a surveillance perspective) of the captured images in a negative way.

According to some embodiments, the step of setting the focus limit comprises setting the focus limit of an autofocus (AF) algorithm of the image capturing device to the threshold distance or less. Advantageously, the required processing power for performing AF may be reduced, since the AF only have to search for focus in a shorter range of distances from the image capturing device. Also, the speed of execution of AF may be increased. Furthermore, the chance of the AF focusing on an "interesting" object (i.e. an object which is not in the privacy area beyond the threshold distance) is increased, thus improving surveillance functionality.

According to some embodiments, the step of setting the focus limit comprises setting the focus limit to the threshold distance minus a determined value, wherein the value is determined based on a current focal length of an optical system (zoom value) of the image capturing device, the F-number of the lens of the image capturing device and the threshold spatial resolution.

Although the optical system of image capturing device can precisely focus at only one distance at a time, the decrease in sharpness is gradual on each side of the focused distance, so that within the depth of field, DOF, the unsharpness is imperceptible under normal viewing conditions. This means that also content at a certain distance beyond the actual focus distance (focal point) will appear acceptably sharp (e.g. having a spatial resolution above the threshold spatial resolution) in the captured image data, which can be taken advantage of when setting the focus limit. Based on a current zoom level (focal length) of the image capturing device, the F-number of the lens of the camera of the image capturing device, the distance from the actual focus distance that will have a spatial resolution above the threshold spatial resolution can be determined. The determined distance may thus be used to set the focus limit. Advantageously, this may reduce the required processing power for ensuring privacy, as well as simplify the setting of focus for the image capturing device. This embodiment may further increase the speed of execution of AF.

According to some embodiments, when the focus limit is set as described above, the step of calculating a maximum spatial resolution consists of calculating the spatial resolution of image data of the image corresponding to content of the scene located on the threshold distance from the image capturing device. By setting the focus limit closer to the image capturing device than the threshold distance, it will be known that no image data of the image corresponding to content of the scene located beyond the threshold distance from the image capturing device will have a higher spatial resolution compared to content of the scene located on the threshold distance from the image capturing device. Consequently, a step of calculating a maximum spatial resolution may be limited to calculating the spatial resolution of image data of the image corresponding to content of the scene located on the threshold distance from the image capturing device. This embodiment may simplify the method, as well as reducing the required processing power for determining a degree of blurring to be applied to the image data in the privacy area of the image.

According to a second aspect, a computer program product comprises a computer-readable storage medium with instructions adapted to carry out the method of the first aspect when executed by a device having processing capability.

According to a third aspect, a device is adapted for determining a degree of blurring to be applied to image data in a privacy area of an image, the image depicting a scene and being captured by an image capturing device, the device comprising a processor configured to:

receive input relating to coordinates of the privacy area of the image; receive input relating to a threshold spatial resolution of image data corresponding to content of the scene located beyond a threshold distance from the image capturing device in the scene, said image data being within the privacy area of the image;

calculate a maximum spatial resolution of the image data of the image corresponding to content of the scene located on or beyond the threshold distance from the image capturing device;

calculate a difference between the maximum spatial resolution and the threshold spatial resolution;

determine a degree of blurring based on the calculated difference, such that for a first difference being larger than a second difference, the degree of blurring determined based on the first difference is larger than the degree of blurring determined for the second difference;

apply the degree of blurring to the image data in the privacy area of the image.

According to a fourth aspect, a system comprises:

a first device for continuously capturing data of a scene, and producing a video stream comprising a sequence of images based on the captured data; and a second device according to the third aspect, adapted to continuously receiving the sequence of images from the first device.

According to some embodiments, the first and the second device is implemented in an image capturing device.

The second, third and fourth aspects may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The aspects will now be described more fully hereinafter with reference to the accompanying drawings, in which embodiments are shown. The systems and devices disclosed herein will be described during operation.

Figure 1:
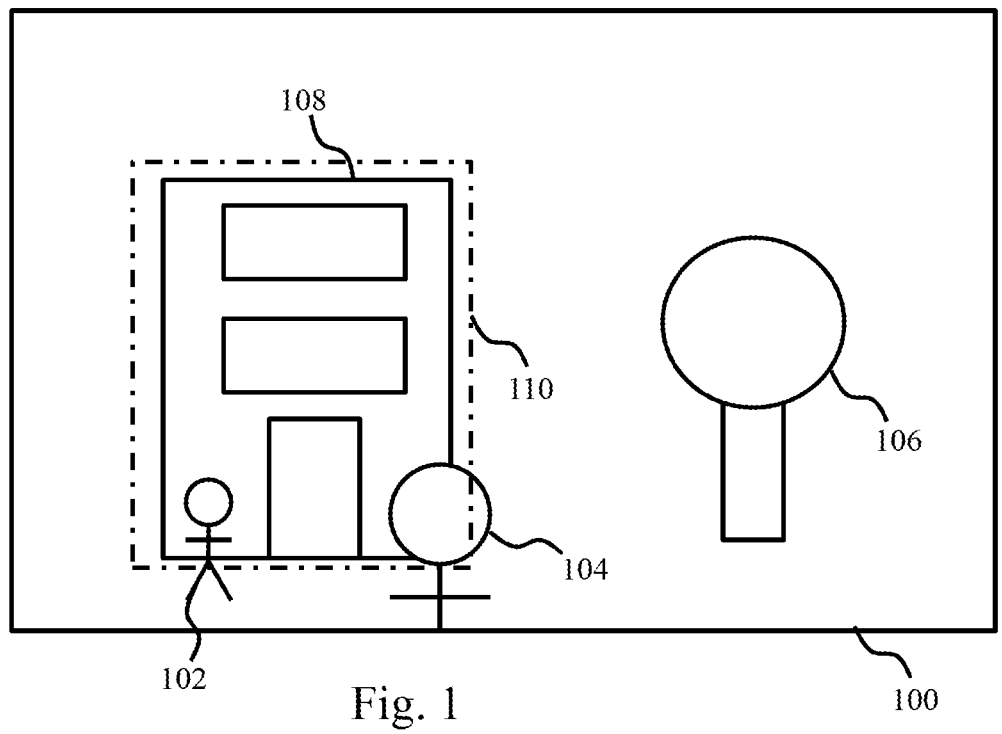
FIG. 1 shows an image depicting scene and comprising a privacy area.

FIG. 1 shows an image depicting a scene 100. The scene 100 comprises several objects 102, 104, 106, 108. In this example, the scene comprises a building 108, a tree 106, and two persons 102, 104. The building 108 has privacy restrictions, and privacy masking (e.g. blurring) is thus required for image data showing the building 108, e.g. the image data showing the building must be blurred to an extent such that details (according to the privacy restrictions) is not visible in the image showing the scene 100. For example, the privacy restrictions may define that the identity of persons entering the building 108 cannot be detected, or that the identity of persons that are visible through the windows of the building 108 is kept private for the viewer of the image. For this reason, a privacy area 110 is defined, surrounding the building 108. As visible in FIG. 1, two persons 102, 104 are depicted at least partly inside the privacy area 110, but clearly positioned in front of the building 108. This means that blurring applied to remove details (lower the spatial resolution) of image data corresponding to the building 108 will also affect the image data corresponding to the two persons 102, 104, since the blurring is applied to all pixels within the privacy area 110.

Figure 2:
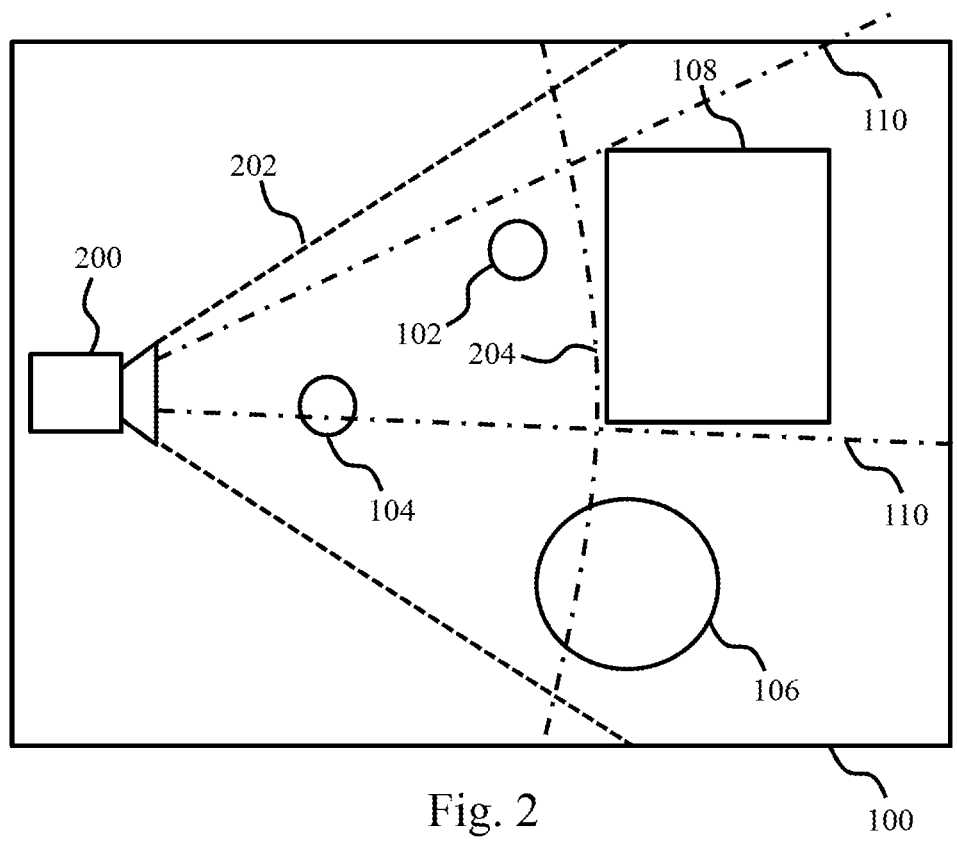
FIG. 2 shows the scene of FIG. 1 from above, including an image capturing device, the privacy area and a privacy threshold distance.

Using the concepts described herein, a threshold distance may be defined, which can be used for determining if, and how much, blurring should be applied to the privacy area of the image. FIG. 2 shows this concept. FIG. 2 shows the same scene 100 depicted in the image of FIG. 1 but seen from above. In addition to the objects 102-108 included in FIG. 1, FIG. 2 also shows an image capturing device 200, and the angle of view (AOV) 202 of the image capturing device 200. The image capturing device 200 may for example be a video camera a still image camera. In FIG. 2, the privacy area 110 is defined as an angular range originating from the image capturing device for ease of explaining. FIG. 2 further includes the threshold distance 204, which may be thought of as defining the privacy area 110 further in terms of a distance from the image capturing device 200. However, as understood by the skilled person, when applying the later determined blurring factor, this will affect all content of the scene within the privacy area 110 e.g. as shown in FIG. 1. FIG. 2 shows that the rightmost person 104 in FIG. 1 is positioned quite far from the threshold distance 204, while the leftmost person 102 is positioned closer to the threshold distance 204, but still on the side of the image capturing device 200 with respect to the threshold distance 204. From a privacy perspective, it is important that the spatial resolution of the image data showing the building 108 is low enough (depending on the use case) to meet the privacy requirements. However, from a surveillance perspective, it may be important that objects (e.g. persons 102, 104) between the building 108 and the video capturing device 200 can be shown in as much details as possible. The inventive concept described herein provides a solution to this problem.

Figure 3:
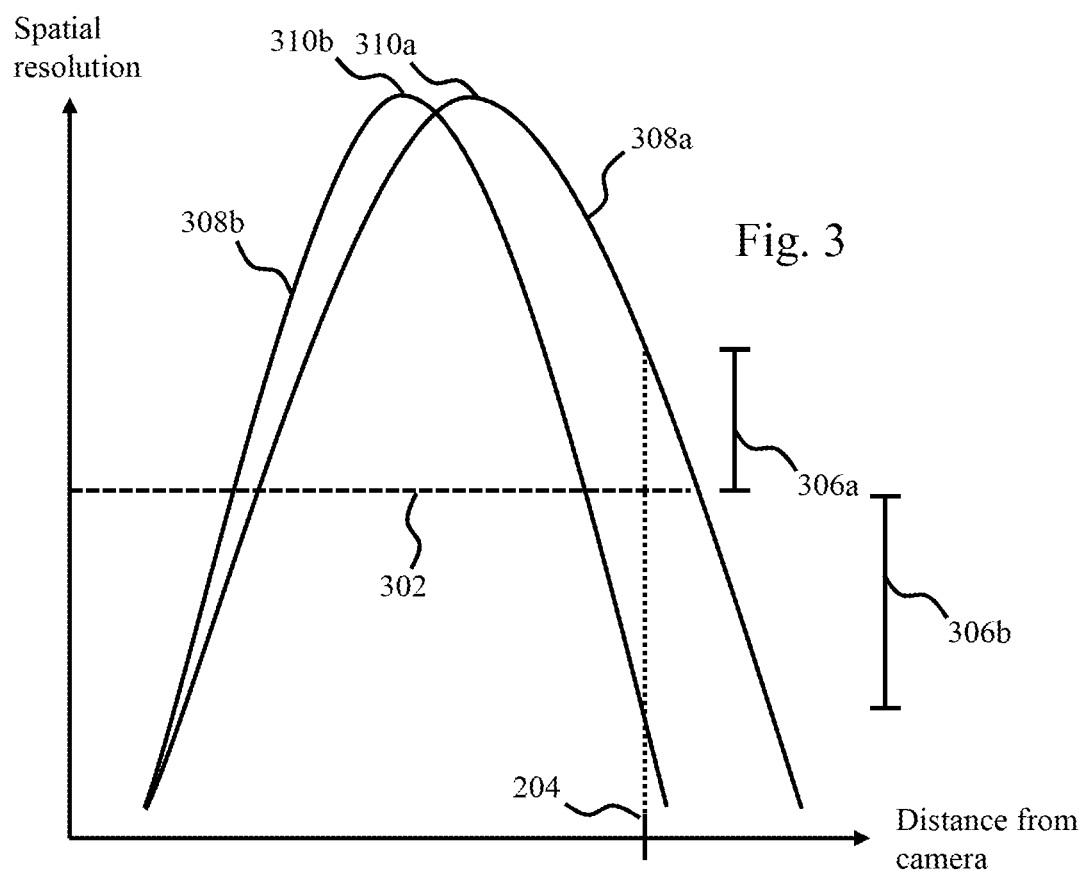
FIGS. 3-4 show example focus curves, and calculation of differences between maximum spatial resolution and a threshold spatial resolution according to embodiments, FIGS. 5a-d each shows an embodiment of a mapping function between calculated differences according to FIGS. 3-4 and a degree of blurring to be applied to the privacy area of the image.

FIG. 3 shows a schematic plot of two different focus curves 308a-b for the video capturing device 200 of FIGS. 1 and 2, depending on e.g. a focus point and a zoom value (focal length) of the image capturing device 200. The plot of FIG. 3 shows spatial resolution of image data based on a distance from the image capturing device at which the content of the scene which the image data corresponds to is located. In other words, the plot shows the spatial resolution as a function of a distance from the camera, or depth in the image. In the example of FIG. 3, the first curve 308a shows a focus curve when the leftmost person 102 is in focus for the image capturing device 200, at a first zoom level. The second curve 308b shows a focus curve when the rightmost person 104 is in focus for the image capturing device 200, at a second zoom level being lower than the first zoom level.

In the plot of FIG. 3, a threshold spatial resolution 302 is shown. The value of the threshold spatial resolution 302 sets a limit for how large the spatial resolution of image data corresponding to content of the privacy area 110 may be. In other words, the value of the threshold spatial resolution 302 sets a limit for the allowed spatial resolution of image data corresponding to content of the scene located beyond the threshold distance 204 from the image capturing device in the scene (the limit is set for image data being within the privacy area 110 of the image), such that the privacy requirements for such image data is met.

The plots of FIG. 3 also show the threshold distance 204. The focus curves 308a-b thus show, for different settings of the image capturing device, what spatial resolution different content of the image will have, depending on the depth in the image (i.e. distance from the image capturing device). For the first focus curve 308a, the spatial resolution for content at the threshold distance 204 differs from the threshold spatial resolution 302 with a positive value 306a. This means that the privacy requirements for the privacy area is not met. For example, this may mean that the faces of people in the windows of the building 108 in FIGS. 1-2 are identifiable. Based on this difference 306a between the maximum spatial resolution and the threshold spatial resolution, a degree of blurring will be determined (as will be further discussed below in conjunction with FIGS. 5a-d) and applied to the image data in the privacy area 110 of the image.

For the second focus curve 308b, the spatial resolution for content at the threshold distance 204 differs from the threshold spatial resolution 302 with a negative value 306b. This means that the privacy requirements for the privacy area are indeed met. For example, this may mean that the faces of people in the windows of the building 108 are not identifiable (e.g. the spatial resolution is less than 1 pixel per 0.1 meter on and beyond the threshold distance, or less than 2, 5, etc. pixels depending on the use case). Consequently, no blurring needs to be applied to the privacy area 110, which may mean that the image data corresponding to the objects 102, 104 can be better used for surveillance/monitoring purposes.

Figure 4:
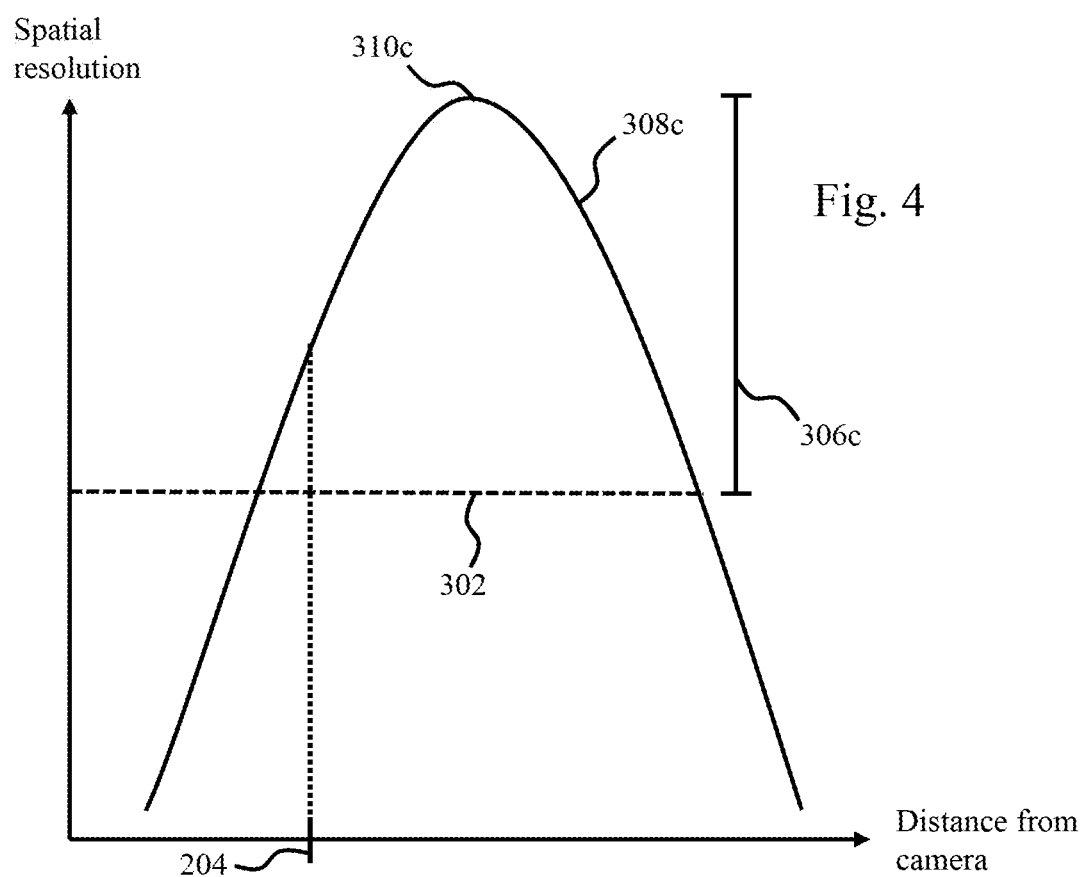

In FIG. 3, the plot shows that peaks 310a-b of the focus curves 308a-b are closer to the image capturing device 200 than the threshold distance 204. This means that the focal point 310a-b of the camera is between the threshold distance and the image capturing device 200, e.g. at threshold distance/1.5 or threshold distance/2. In this case, the maximum spatial resolution of the image data of the image corresponding to content of the scene located on or beyond the threshold distance 204 from the image capturing device 200 will always be the spatial resolution at the threshold distance 204. However, this is not always the case. FIG. 4 shows an example where the focus point 310c is beyond the threshold distance 204. In this case, the difference between the maximum spatial resolution and the threshold spatial resolution 302 will be the difference 306c between the spatial resolution at the focus point 310c distance from the image capturing device 200, i.e. the focal length of the optical system of the image capturing device 200 when capturing the image. This difference 306c will then be used to determine the degree of blurring to be applied to the image data of the privacy area 110 of the image.

The maximum spatial resolution for objects in a scene located on or beyond a threshold distance from the image capturing device may be calculated using algorithms defined for calculation of the term "circle of confusion", e.g. as defined in the Wikipedia article on the subject at the date of filing of the present application (https.//en.wikipedia.org/wiki/Circle_of_confusion).

Specifically, to calculate the diameter of the circle of confusion in the image plane for an out-of-focus subject, one method is to first calculate the diameter of the blur circle in a virtual image in the object plane and then multiply by the magnification of the system, which is calculated with the help of the lens equation. The circle of confusion (CoC) diameter, i.e. the blur circle, of diameter C, may be calculated using the formula:

$$C = \frac{\text{abs}(S2 - S1)}{S2} * \frac{f^2}{N*(S1 - f)} \qquad \text{Equation 1}$$

where C=diameter of CoC, S1=the focal point of the image capturing device (i.e. the distance where the focus curve peaks, e.g. reference 310a-b in FIG. 3), S2=the threshold distance (e.g. reference 204 in FIG. 3), N=the F-number of a lens of the image capturing device and f=the focal length of the optical system of the image capturing device.

Given that $$C = f*\tan(th) \qquad \text{Equation 2}$$

where th=the angular resolution, and by the approximation that tan(th)=th for small angles, it is given that:

$$th = \frac{\text{abs}(S2 - S1)}{S2} * \frac{f}{N*(S1 - f)} \qquad \text{Equation 3}$$

If Equation 3 is evaluated at the threshold distance (S2), and by subtracting the threshold spatial resolution (th'), the degree of blurring (B) (in pixels) may be calculated by:

$$B = f*\left(\text{abs}\left(\frac{\text{abs}(S2-S1)}{S2} * \frac{f}{(N*S1-f)}\right) - th'\right)/p \qquad \text{Equation 4}$$

where p=the pixel pitch of an image sensor of the image capturing device, and where S1 is between the image capturing device and the threshold distance S2 (as described in FIG. 3). For the case where S1 is beyond S2 (as described in FIG. 4), B may be calculated by:

$$B = \frac{f*th'}{p} \qquad \text{Equation 5}$$

Figure 5A:
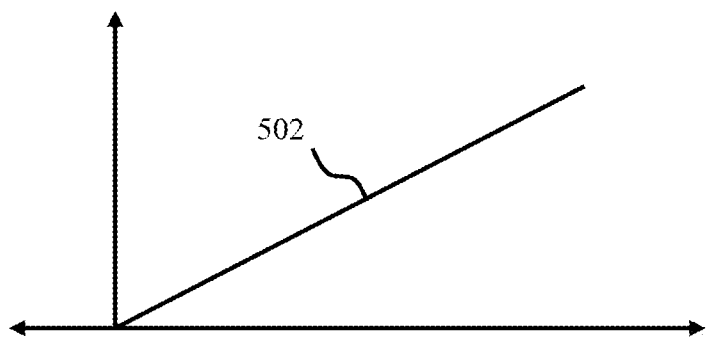
Figure 5B:
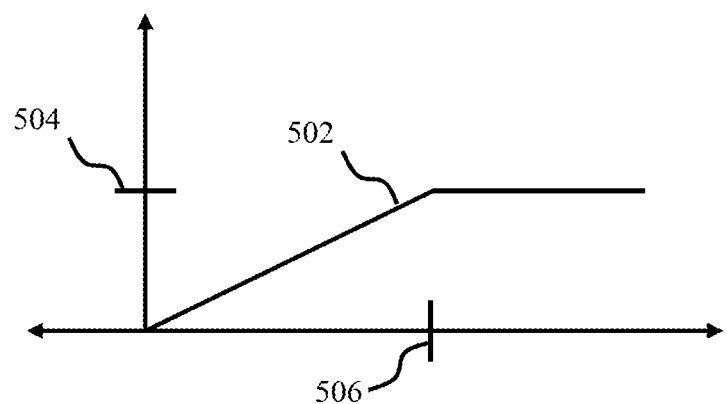

The equation 1-5 specifies an exact way of calculating the degree of blurring to be applied. This is schematically shown in FIG. 5a, where a continuous mapping function 502 between the degree of blurring and the calculated difference between the maximum spatial resolution and the threshold spatial resolution is shown. However, the mapping function 502 may comprise a predetermined maximum degree of blurring as shown in FIG. 5b. In this case, when the difference is above a threshold difference 506, the degree of blurring is set to a predetermined value 504 (for example a kernel size of 128*128 pixels for the used low-pass filter). When the difference is between zero and the threshold difference 506, the degree of blurring is determined to a value between zero and the predetermined value 504, wherein the value is related to the difference. In FIG. 5b, between zero and the threshold difference 506, the mapping function 502 is continuous as in FIG. 5a. Just as for the example shown in FIG. 5a, for differences below zero, the degree of blurring is determined to be zero.

Figure 5C:
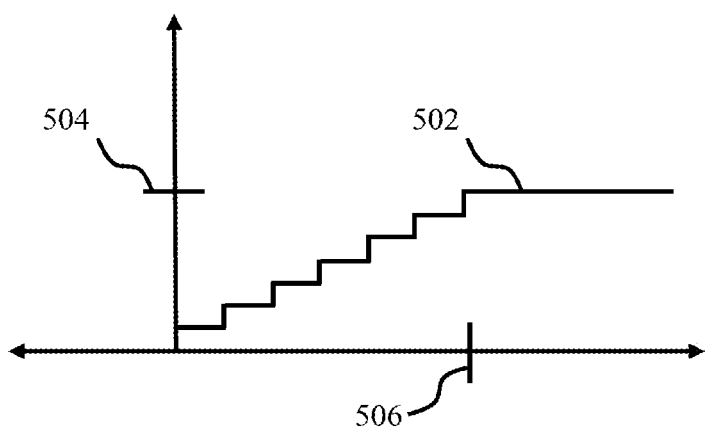

In FIG. 5c, the max blurring degree 504 still applies as in FIG. 5b. However, in FIG. 5c, between zero and the threshold difference 506, the mapping function 502 is a step function being step wise correlated to the distance.

Figure 5D:
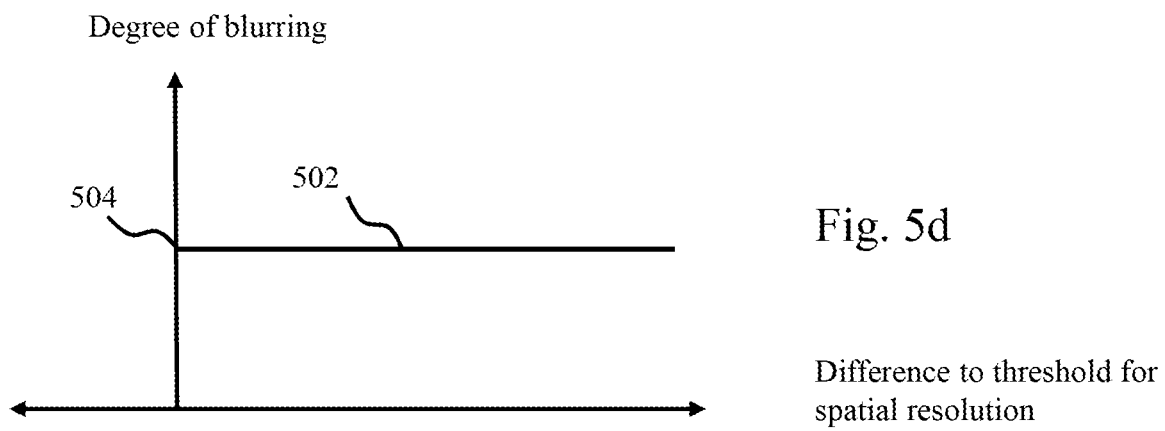

In the simplest form, the mapping function between the calculated difference and the determined blurring factor (degree of blurring) is as shown in FIG. 5d. For differences above zero, a predetermined degree of blurring 504 is applied to the privacy area of the image. For differences below zero, no degree of blurring is applied.

In all examples shown in FIGS. 5a-d, for a first difference being larger than a second difference, the degree of blurring determined based on the first difference is larger than the degree of blurring determined for the second difference.

Figure 7:
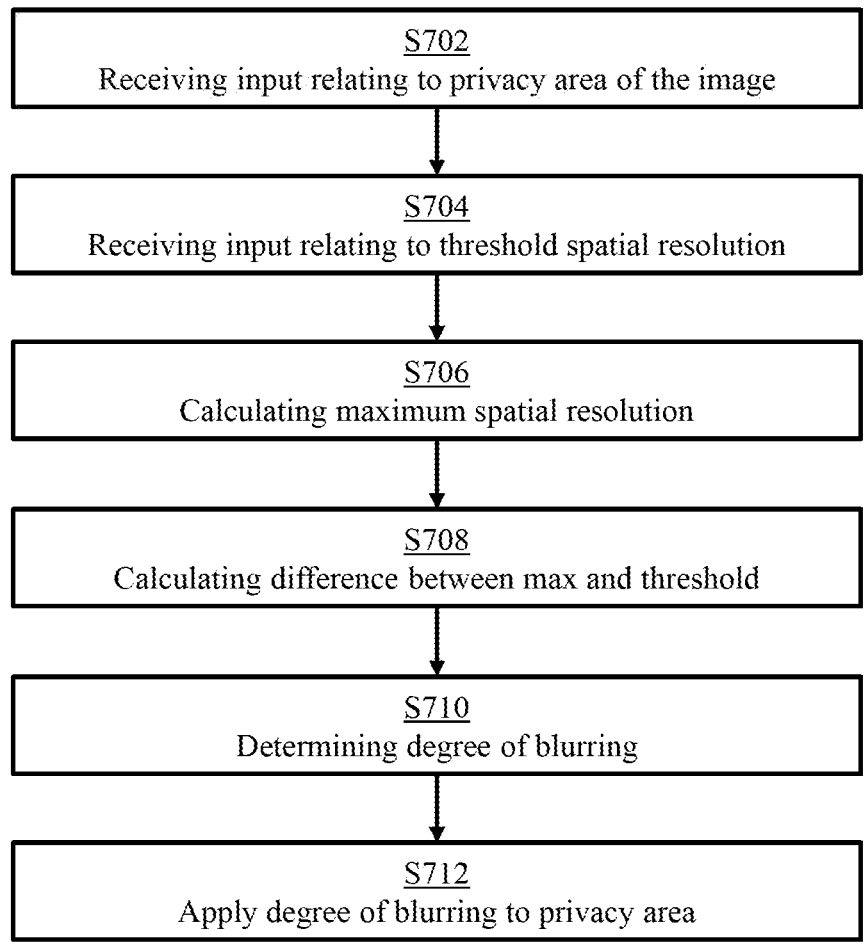
FIG. 7 shows a method for determining a degree of blurring to be applied to image data in a privacy area of an image according to embodiments.

FIG. 7 shows by way of example a method for determining a degree of blurring to be applied to image data in a privacy area of an image, for example for the scenario shown in FIGS. 1-2.

According to embodiments, the method comprises the step of receiving, S702, input relating to coordinates of the privacy area of the image.

The method further comprises receiving, S704, input relating to a threshold spatial resolution of image data corresponding to content of the scene located beyond a threshold distance from the image capturing device in the scene.

The threshold spatial resolution may be received e.g. in the form of an angular resolution for each pixel in the image (i.e. 1° or 0.5°), or a value describing how many pixels an object of a certain size should be represented by at the threshold distance (e.g. 15*15 pixels for a 1*1 meter large object) or any other suitable measure of spatial resolution.

Further, the method comprises calculating S706 a maximum spatial resolution of the image data of the image corresponding to content of the scene located on or beyond the threshold distance from the image capturing device, e.g. using equation 3 above, or adaptations of equation 3 based on the format of the received threshold spatial resolution.

The two measures, the threshold spatial resolution and the maximum spatial resolution is then used for calculating S708 a difference between the maximum spatial resolution and the threshold spatial resolution, and determining S710 a degree of blurring based on the calculated difference, such that for a first difference being larger than a second difference, the degree of blurring determined based on the first difference is larger than the degree of blurring determined based on the second difference. The determined degree of blurring is then applied to the pixels of the privacy area, for example using a gaussian filter, an average filter or a pixelization filter, wherein the degree of blurring determines the size of the applied filter.

The determined degree of blurring is then applied S712 to the privacy area of the image, i.e. by applying the low pass filter with a kernel size according to the determined degree of blurring.

As described in FIGS. 3 and 4, the focus point of the image capturing device can be both closer to the image capturing device compared to the threshold distance, as well as beyond the threshold distance. The presence of a threshold distance can be taken advantage of in the context of focus limits of the image capturing device, in that the focus limit can be set to the threshold distance or less. Since, from a privacy perspective, it may not be advantageous if the focus point is on or beyond the threshold distance (which will increase the spatial resolution of the image data of the image corresponding to content of the scene located on or beyond the threshold distance from the image capturing device as described above), the focus limit can advantageously be set to the threshold distance or less. This in turn will reduce the spatial resolution of the image data of the image corresponding to content of the scene located on or beyond the threshold distance from the image capturing device, and thus reduce the required additional blurring that needs to be applied to the privacy area. Moreover, by setting a focus limit, autofocus, AF, of the image capturing device may be achieved both faster and requiring less processing power, since the possible range for AF is reduced.

Figure 6:
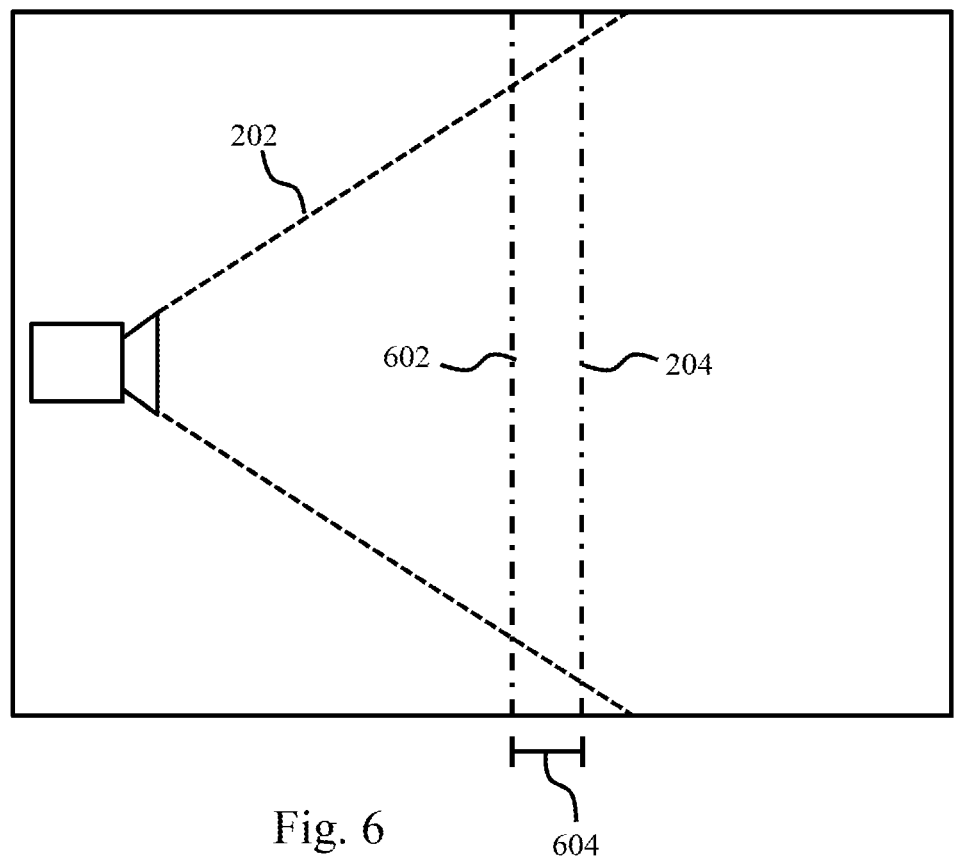
FIG. 6 shows a method for setting a focus limit of an image capturing device according to embodiments.

According to some embodiments, the focus limit is set to the threshold distance minus a determined value. This is shown in FIG. 6, where the focus limit 602 is set at a distance 604 from the threshold distance 204. As described above, also content at a certain distance beyond the actual focus point will appear acceptably sharp (e.g. having a spatial resolution above the threshold spatial resolution, also known as Depth of Field, DoF) in the captured image data, which can be taken advantage of when setting the focus limit. The determined value 604 is calculated e.g. as described above, using the focal length, the F-number, and the threshold spatial resolution.

Figure 8:
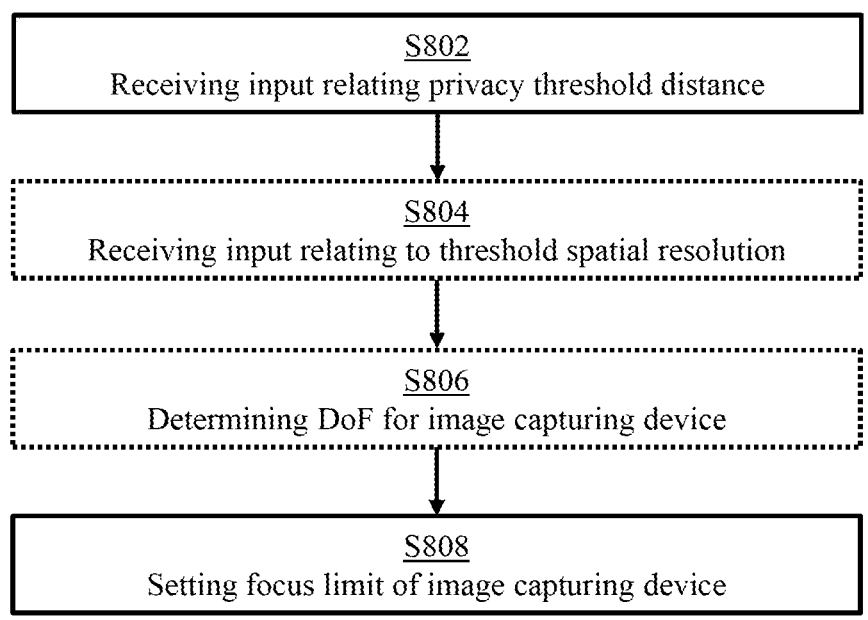
FIG. 8 shows a method for setting a focus limit of an image capturing device according to embodiments.

It should be noted that the above strategy of setting of a focus limit may be performed independently of the method for determining a degree of blurring to be applied to image data in a privacy area of an image as described above. Such independently performed method is shown in FIG. 8.

In its simplest form, the method for setting a focus limit of an image capturing device comprises the steps of receiving S802 input relating to a privacy threshold distance relating to a privacy requirement for images captured by the image capturing device. The privacy threshold distance may be defined similar to what is described above, i.e. a distance from the camera beyond which privacy requirements applies.

The method further comprises the step of setting S808 a focus limit of the image capturing device to the threshold distance or less.

This method can, according to embodiments, further take advantage of the DoF-concept as described above in conjunction with FIG. 6. In this embodiment, the method further comprises receiving S804 input relating to a threshold spatial resolution of image data corresponding to content of the scene located beyond the threshold distance 204 from the image capturing device in a scene captured by the image capturing device.

The threshold spatial resolution can then be used for calculating the DoF for the image capturing device (with its current settings, e.g. F-number) for focal points (focus points) at some distances from the privacy threshold distance. As described above, also content at a certain distance beyond the actual focus point will appear acceptably sharp (e.g. having a spatial resolution above the threshold spatial resolution, also known as Depth of Field, DoF) in the captured image data, which can be taken advantage of when setting the focus limit. By taking the DoF into account, the focus limit of the image capturing device can be set at a distance from the privacy threshold, such that the spatial resolution on and beyond the privacy threshold distance always will be lower than the threshold spatial resolution. Determining at what distance from the privacy threshold distance the focus limit should be may be an iterative process, where a plurality of focus points are used for calculation of DoF for the camera (where the threshold spatial resolution thus is used for defining the circle of confusion criteria), and where the focus point where the acceptably sharp area ends closest to the threshold distance is set S808 as the focus limit for the image capturing device.

In other embodiments, depending on the threshold spatial resolution and the settings of the image capturing device, a focus limit is set S808 based on e.g. a predetermined table of focus limits.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A computer-implemented method for determining a degree of blurring to be applied to image data in a privacy area of an image, the image depicting a scene and being captured by an image capturing device, the method comprising the steps of:
   receiving input relating to coordinates of the privacy area of the image;
   receiving input relating to a threshold spatial resolution of image data corresponding to content of the scene located beyond a threshold distance from the image capturing device in the scene, said image data being within the privacy area of the image;
   calculating a maximum spatial resolution of the image data of the image corresponding to content of the scene located on or beyond the threshold distance from the image capturing device;
   calculating a difference between the maximum spatial resolution and the threshold spatial resolution;
   determining a degree of blurring based on the calculated difference, such that for a first difference being larger than a second difference, the degree of blurring determined based on the first difference is larger than the degree of blurring determined for the second difference;
   applying the degree of blurring to the image data in the privacy area of the image.

2. The method according to claim 1, wherein if the calculated difference is zero or negative, the degree of blurring is determined to be zero.

3. The method according to claim 2, further comprising
   when the difference is above a threshold difference, determining the degree of blurring to a predetermined value, and
   when the difference is between zero and the threshold difference, determining the degree of blurring to a value between zero and the predetermined value, wherein the value is related to the difference.

4. The method of claim 1, wherein the step of calculating the maximum spatial resolution is performed based on a focal length of an optical system of the image capturing device, the F-number of the optical system of the image capturing device, and a pixel pitch of an image sensor of the image capturing device.

5. The method of claim 1, wherein the step of applying the degree of blurring to the image comprises one from the list of: applying a gaussian filter, applying an average filter, applying a pixelization filter;
wherein the degree of blurring determines the size of the applied filter.

6. The method of claim 1, further comprising the step of:
determining that the privacy area covers at least a threshold portion of the image,
setting a focus limit of the image capturing device to the threshold distance or less.

7. The method of claim 6, wherein the step of setting the focus limit comprises setting the focus limit of an autofocus algorithm of the image capturing device to the threshold distance or less.

8. The method of claim 6, wherein the step of setting a focus limit comprises:
setting the focus limit to the threshold distance minus a determined value, wherein the value is determined based on a current focal length of an optical system of the image capturing device, the F-number of the optical system of the image capturing device and the threshold spatial resolution.

9. The method of claim 6, wherein the step of calculating a maximum spatial resolution comprises calculating the spatial resolution of image data of the image corresponding to content of the scene located on the threshold distance from the image capturing device.

10. A computer program product comprising a non-transitory computer-readable storage medium with instructions adapted to carry out the method of claim 1 when executed by a device having processing capability.

11. A device adapted for determining a degree of blurring to be applied to image data in a privacy area of an image, the image depicting a scene and being captured by an image capturing device, the device comprising a processor configured to:
receive input relating to coordinates of the privacy area of the image;
receive input relating to a threshold spatial resolution of image data corresponding to content of the scene located beyond a threshold distance from the image capturing device in the scene, said image data being within the privacy area of the image;
calculate a maximum spatial resolution of the image data of the image corresponding to content of the scene located on or beyond the threshold distance from the image capturing device;
calculate a difference between the maximum spatial resolution and the threshold spatial resolution;
determine a degree of blurring based on the calculated difference, such that for a first difference being larger than a second difference, the degree of blurring determined based on the first difference is larger than the degree of blurring determined for the second difference;
apply the degree of blurring to the image data in the privacy area of the image.

12. A system comprising
a first device for continuously capturing data of a scene, and producing a video stream comprising a sequence of images based on the captured data;
a second device according to claim 11, adapted to continuously receiving the sequence of images from the first device.

13. The system of claim 12, wherein the first device and the second device are implemented in an image capturing device.

* * * * *